United States Patent [19]

Johnson, Jr.

[11] Patent Number: 4,758,379
[45] Date of Patent: Jul. 19, 1988

[54] PROCESS OF PREPARING POLYOL ESTERS OF ROSIN WITH EXCESS ROSIN

[75] Inventor: Robert W. Johnson, Jr., Savannah, Ga.

[73] Assignee: Union Camp Corporation, Wayne, N.J.

[21] Appl. No.: 931,550

[22] Filed: Nov. 14, 1986

[51] Int. Cl.$^4$ ............................. C09F 7/00; C09F 1/04
[52] U.S. Cl. .................................... 260/104; 260/103
[58] Field of Search .............................. 260/104, 103

[56] References Cited

U.S. PATENT DOCUMENTS

| | | | |
|---|---|---|---|
| 2,331,803 | 10/1943 | Schlaanstine | 260/104 |
| 2,729,660 | 1/1956 | Harrison | 260/104 |
| 2,736,664 | 2/1956 | Bradley et al. | 260/104 |
| 2,815,295 | 12/1957 | Forsythe | 260/104 |
| 4,548,746 | 10/1985 | Duncan et al. | 260/104 |

Primary Examiner—Harold D. Anderson
Attorney, Agent, or Firm—Edward J. Sites

[57] ABSTRACT

A method of preparing polyol esters of rosin comprises carrying out the esterification in an equivalent excess proportion of the rosin reactant. The product of the esterification has novel characteristics including a higher content of fully esterified polyol reactant.

30 Claims, No Drawings

PROCESS OF PREPARING POLYOL ESTERS OF ROSIN WITH EXCESS ROSIN

The invention relates to methods of esterifying rosin with a polyol.

BACKGROUND OF THE INVENTION

The prior art literature is replete with descriptions of methods for esterifying rosin with a polyol. Representative of such literature are the U.S. Pat. Nos. 1,696,337; 1,697,530; 1,734,987; 1,893,982; 2,327,009; 2,369,125; 2,409,332; 2,420,926; 2,434,168; 2,440,242; 2,536,600; 2,572,086; 2,590,910; 2,736,664; 2,864,810; and 3,780,012.

The large number of prior art references describing the esterification of rosin with a polyol is a reflection of the need in the art for improvements in methods of preparation. The method of the present invention is such an improvement, resulting in a more efficient process and a unique product composition.

SUMMARY OF THE INVENTION

The invention comprises a method of preparing a polyol ester of rosin, which comprises esterifying the rosin with a polyol in the presence of an equivalent excess of rosin.

DETAILED DESCRIPTION OF THE PREFERRED EMBODIMENTS OF THE INVENTION

The rosins which may be esterified by the method of the invention are well known compounds as are methods of their preparation. Rosin is mainly a mixture of $C_{20}$, fused-ring, monocarboxylic acids, typified by levopimaric and abietic acids. The rosins include gum rosin, wood rosin and tall oil rosin. The method of the invention is particularly advantageous when applied to esterification of tall oil rosin. The rosin may be hydrogenated, disproportionated or polymerized rosin as well as crude, untreated rosin.

The polyols employed in the method of the invention are also well known and are represented by diols such as ethylene glycol, propylene glycol, diethylene glycol, triethylene glycol, tetraethylene glycol, trimethylene glycol; triols such as glycerol; tetrols such as pentaerythritol; hexols such as mannitol and sorbitol and like polyols. The method of the invention is particularly advantageous when the polyol selected is pentaerythritol.

The esterification of the invention may be carried out in the presence of a catalytic proportion of an esterification catalyst. Representative of known catalysts, employed in catalytic proportions, are calcium hydroxide, zinc oxide, phosphoric acid, p-toluene sulfonic acid, lithium carbonate and the like. A catalytic proportion is generally within the range of from about 0.01 to 5.0 percent by weight of the rosin, preferably 0.1 to 1.0 percent.

Esterification is advantageously carried out by bringing together the polyol and an equivalent excess of the rosin in an appropriate reaction vessel and heating the mixture to a temperature within the range of from about 150° C. to 300° C., preferably 180° C. to 280° C. Advantageously, a 10 to 70 percent equivalent excess of the rosin is employed in the reaction mixture; preferably 12 to 50 percent equivalent excess.

Esterification may be carried out under a broad range of pressure conditions including sub-, super- and atmospheric pressures. Advantageously, atmospheric pressures are employed.

Advantageously, the esterification reaction can be accomplished in the presence of an inert atmosphere, such as a nitrogen gas atmosphere provided by a nitrogen purge of the reaction vessel prior to addition of the reactants and a nitrogen sparge during the reaction. Since light color is a desirable property of the rosin ester and the color is sensitive to oxygen exposure, oxygen exposure is preferably minimized.

Progress of the esterification may be followed by conventional analyses of the reaction mixture to determine the acid number. The esterification may be terminated to any desired acid number. In general, the reaction is accepted as sufficiently complete when the acid number does not change appreciably with time.

The following examples describe the manner and the process of making and using the invention and set forth the best mode of carrying out the invention, but are not to be considered as limiting the invention.

The softening points were determined by the Ball and Ring method of ASTM test method 28-58T.

The rosin colors referred to herein are United States Department of Agriculture (USDA) standards varying from X, the lightest to D the darkest color. The color scale is designated by the symbols X, WW, WG, N, M, K, I, H, G, F and D.

EXAMPLES 1-3

Examples 1-3 are not Examples of the invention, but are made to illustrate rosin pentaerythritol ester formation using an excess amount of pentaerythritol over that stoichiometrically required for reaction with rosin.

EXAMPLE 1

One hundred grams of purified disproportionated rosin was placed in a four-necked flask and heated up to 180° C. under an atmosphere of nitrogen. After the rosin was melted, agitation was started and 14 g of pentaerythritol (about 31% equivalent excess) was added to the rosin at 220° C. The mixture was heated up to 285° C. and subjected to esterification at 285° C. for 12 hours to give 102 g of a rosin ester having an acid value of 10, a softening point of 117° C., a weight average molecular weight of 939 and a Gardner color of 7.

EXAMPLE 2

To a suitable reaction vessel equipped with stirrer, the thermometer were added 100 parts of tall oil rosin having a color WW. There were next added 12 parts (about 12% equivalent excess) of pentaerythritol and 0.05% calcium hydroxide as the catalyst, based on the weight of the tall oil rosin. The mixture was heated to 275° C. for eight hours. The product tall oil rosin pentaerythritol was found to have the color I.

EXAMPLE 3

To a suitable plant scale esterification reactor were added 100 parts of a tall oil rosin with a Gardner color of 7+, 12.2 parts of pentaerythritol (about 15% equivalent excess) and 0.2 parts of 50% active phosphinic acid in water. The mixture was heated at up to 280° C. for 17½ hours to give an ester with an acid number of 8.9, a 96° C. Ring and Ball softening point and a color 8.

EXAMPLE 4–10

These examples show that the use of excess rosin greatly shorten the reaction time required to make polyol esters of rosin. A disproportionated tall oil rosin having an acid number of 165 and a Gardner color was 20 used in all Examples.

To a suitable reaction vessel equipped with stirrer and thermometer were added 2400 gms of the disproportionated rosin, and various amounts of pentaerythritol and catalyst as shown in Table 1. The mixture was heated to 275° C. for the desired reaction time. After the desired reaction time the excess rosin was stripped from the ester using vacuum or vacuum/steam. The stripping can be done batchwise from the reaction vessel or continuously in a separate distillation still, preferably a wiped film evaporator-type unit. The use of a basic catalyst such as lithium carbonate generally gave esters having colors of about 5 Gardner while the use of known bleaching agents such as benzene phosphinic acid or phosphinic acid generally gave esters having colors of 4 Gardner. The conditions and results of these runs together with the acid numbers, softening points and colors of the esters obtained are shown in Table 1, below.

ric. The analytical result together with a comparison to esters formed using an equivalent excess of polyol or equivalent proportions of rosin and polyol are shown in Table 2, below.

TABLE 2

| Example | Equivalent % Excess Rosin | Mono | Di | Tri | Tetra | Higher |
|---|---|---|---|---|---|---|
| 4 | 20 | — | 1.5 | 14 | 50 | 33 |
| 5 | 20 | — | 1.6 | 8.3 | 54 | 36 |
| 6 | 25 | — | - | 6.9 | 52 | 35 |
| 7 | 25 | — | — | — | 59 | 34 |
| 8 | 50 | — | — | — | 51 | 40 |
| 9 | 50 | — | — | — | 78 | 18 |
| 10 | 20 | — | 1.6 | 25 | 42 | 27 |
| Ester made using 15% excess pentaerythritol (PE) | | — | 4.4 | 26 | 36 | 26 |
| Ester made using equivalent amount of PE | | — | 4.3 | 26 | 38 | 30 |

As may be seen in Table 2, the use of an excess of rosin in making pentaerythritol esters can give different ester distributions that cannot be obtained when using an equivalent amount of excess of pentaerythritol. Runs 7, 8 and 9 in Table 2 show a composition having no mono, di or tri rosin ester moieties present. Thus, there are not free hydroxyl groups present in the esters prepared in these runs. Typical runs using excess pentaerythritol give some di and a considerable amount of the tri rosin ester moieties.

Aliquots of the esters obtained in the Examples 4–10 are also taken and subjected to analysis to determine their mono, di, tri, tetra and higher ester content. Longer reaction times favor the tetra isomer formation when using an excess amount of rosin over stoichiomet-

TABLE 1

| | | | | | Final Ester Properties | | |
|---|---|---|---|---|---|---|---|
| Example | Pentaerythritol, (g) | Equivalent % Excess Rosin | Catalyst | Reaction Time, Before Stripping, Hr. | Acid No. | S.P. | Color, G |
| 4* | 208 | 20 | Li$_2$CO$_3$ | 3.0 | 1.6 | 99.5 | 5– |
| 5* | 208 | 20 | Benzene Phosphinic Acid | 3.0 | 3.5 | 101.5 | 4 |
| 6* | 198.5 | 25 | Li$_2$CO$_3$ | 3.0 | 2.2 | 101 | 5 |
| 7 | 198.5 | 25 | H$_3$PO$_2$ | 2.5 | 11 | 101 | 4– |
| 8 | 165.1 | 50 | Li$_2$CO$_3$ | 5.0 | 7.8 | 102 | 5– |
| 9 | 165.1 | 50 | Li$_2$CO$_3$ | 2.5 | 9.9 | 102 | 5 |
| 10 | 208 | 20 | None | 3.0 | 9.0 | 96 | 6– |

*Excess rosin stripped out using a wiped film distillation unit.
All runs except 9 used technical grade PE which contains about 12% di PE. Run 9 used pure PE containing about 99% mono PE.

What is claimed is:

1. A method of preparing a polyol ester of rosin which is essentially free of the mono-, di- and tri-ester of said rosin, which consists essentially of esterifying an equivalent excess proportion of rosin with the polyol.

2. The method of claim 1 wherein the rosin is tall oil rosin.

3. The method of claim 2 wherein the rosin is a disproportionated rosin.

4. The method of claim 3 wherein the polyol is pentaerythritol.

5. The method of claim 1 wherein the polyol is pentaerythritol.

6. The method of claim 1 wherein the proportion of rosin is within the range of from about 5 to 70 equivalent percent excess.

7. The method of claim 6 carried out at a temperature within the range of from about 150° C. to 300° C.

8. The method of claim 6 carried out under an inert gas atmosphere.

9. The method of claim 1 carried out in the presence of a catalytic proportion of an esterification catalyst.

10. The method of claim 1 wherein after esterification the excess rosin is stripped from the polyol ester of rosin.

11. The method of claim 2 wherein after esterification the excess rosin is stripped from the polyol ester of rosin.

12. The method of claim 3 wherein after esterification the excess rosin is stripped from the polyol ester of rosin.

13. The method of claim 4 wherein after esterification the excess rosin is stripped from the polyol ester of rosin.

14. The method of claim 5 wherein after esterification the excess rosin is stripped from the polyol ester of rosin.

15. The method of claim 6 wherein after esterification the excess rosin is stripped from the polyol ester of rosin.

16. The method of claim 9 wherein after esterification the excess rosin is stripped from the polyol ester of rosin.

17. The ester made according to the method of claim 1.

18. The ester made according to the method of claim 2.

19. The ester made according to the method of claim 3.

20. The ester made according to the method of claim 4.

21. The ester made according to the method of claim 5.

22. The ester made according to the method of claim 6.

23. The ester made according to the method of claim 9.

24. The ester made according to the method of claim 10.

25. The ester made according to the method of claim 11.

26. The ester made according to the method of claim 12.

27. The ester made according to the method of claim 13.

28. The ester made according to the method of claim 14.

29. The ester made according to the method of claim 15.

30. The ester made according to the method of claim 16.

* * * * *